C. A. Harper,
Converting Motion.
Nº 25,966.  Patented Nov. 1, 1859.
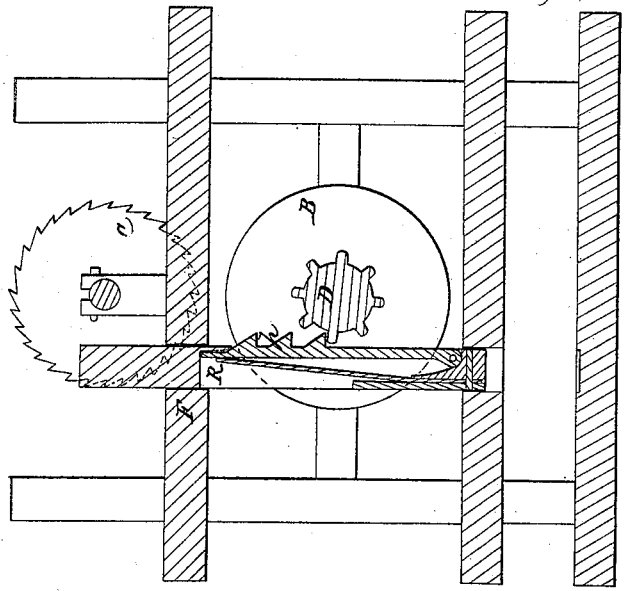
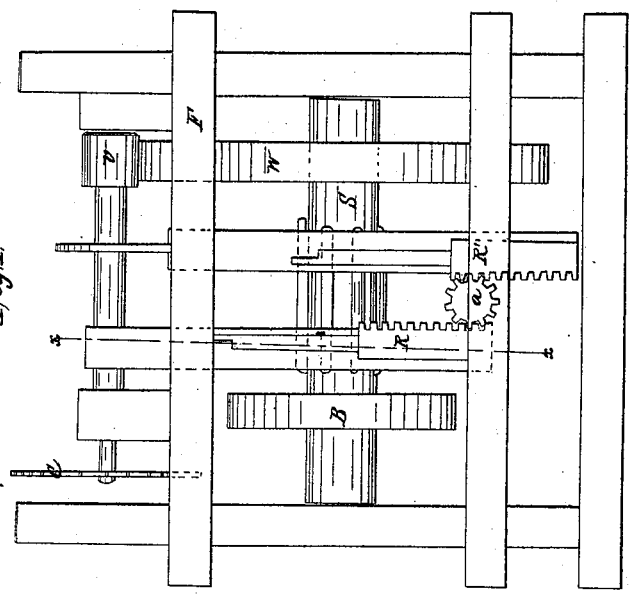
Witnesses.
H. C. Jewell
Wm. Benge
Inventor.
C. A. Harper

UNITED STATES PATENT OFFICE.

C. A. HARPER, OF FORT WORTH, TEXAS.

CONVERTING RECIPROCATING INTO ROTARY MOTION.

Specification of Letters Patent No. 25,966, dated November 1, 1859.

*To all whom it may concern:*

Be it known that I, C. A. HARPER, of Fort Worth, in the county of Tarrant and State of Texas, have invented a new and useful Improvement in Modes of Converting Reciprocating Motion into Rotary; and I do hereby declare that the following is a full, clear, and exact description of the same, reference being had to the annexed drawing, forming part of this specification, in the several figures of which similar characters of reference denote the same part.

Figure 1, is a side elevation of my improvement. Fig. 2 is a vertical section on line $x$ $x$.

This invention has for its object converting reciprocating motion into rotary, and its nature consists in having two vertically moving racks with a cog wheel on a small shaft between them which gears into the teeth of the racks and thus produces the reciprocating motion. These racks have in them a set of spring pawls which yield as they move upward but as they go downward catch in the cogged teeth of a drum on a shaft having a balance wheel at one end, and a large wheel at the other end, thus producing the revolution of said shaft, and wheels. The revolving of this large wheel, by means of a friction roller on a smaller shaft above the frame to which the saw is attached, turns this shaft and produces the rotary motion.

In the drawing R, R′, are the reciprocating racks which move vertically through openings in frames F.

$a$, is the cog wheel between the racks R, R′ which gears into their teeth, and produces their reciprocating motion.

$p$, represents the spring pawls on racks R, R′; D, the drum on shaft S; B, its balance wheel; W, the large wheel on shaft S.

S′, is the smaller shaft having the friction roller $r$, at one end, by the contact of which with wheel W, its revolution is produced, and the circular saw C, at the other end.

The power being applied to rack R′, forces it down and turning the gear wheel $a$, forces rack R up, thus producing a reciprocating motion of the racks. The pawls $p$ being on a spring yield and sink into the rack as it passes upward but on going down they catch in the teeth of drum D, and turn it and consequently shaft S, and wheels B, and W, and wheel W, coming in contact with friction roller $r$, on shaft S′, produces its revolution and that of the circular saw C, thus producing the rotary motion of saw C, by means of the reciprocating movement of racks R, R′.

I claim—

Producing the rotary motion of shaft S′, and saw C, by the reciprocating racks R R′, in combination with, gear wheel $a$, spring pawls $p$, drum D, shafts S, and wheels B, and W, substantially as described.

In testimony whereof, I have hereunto signed my name before two subscribing witnesses.

C. A. HARPER.

Witnesses:
D. C. DADE,
Jos. C. TERRELL.